Patented Dec. 5, 1939

2,182,357

UNITED STATES PATENT OFFICE 2,182,357

MANUFACTURE OF CASEIN PRODUCTS

Charles Schwartz, Pittsburgh, Pa., assignor to Hall Laboratories, Inc., Pittsburgh, Pa., a corporation of Pennsylvania No Drawing. Application June 17, 1937, Serial No. 148,750

6 Claims. (Cl. 134—12)

This invention relates generally to the manufacture of casein products useful in the paper, paint, glue and other industries, and more particularly to casein products containing, in addition to the usual ingredients, an alkali-metal tripolyphosphate such for example as sodium tripolyphosphate.

The present invention is an improvement on the invention described in my Patent No. 2,064,387, granted December 15, 1936. That patent relates to casein products containing an alkali-metal metaphosphate, the preferred alkali-metal metaphosphate being Graham's salt, which is sodium hexametaphosphate, and also to a process of emulsifying casein-water-oleaginous mixtures by mixing with such mixtures an alkali-metal metaphosphate. The casein products referred to in my patent are adapted for use as coating and sizing compositions for paper and fabrics, and as paints, glues and the like. The addition of sodium metaphosphate, for example, to the casein products overcomes or minimizes many of the objections to prior known casein products. In the paper industry, for example, casein coatings were objectionable in that there was great difficulty in controlling the fluidity of the casein mixture so as to obtain the proper results in the coating operation. There was a great tendency for particles of the casein to remain undissolved and collect in the brushes used in applying the coating and from which they dropped off onto the paper, forming lumps thereon. The casein coating compositions also produced objectionable foaming.

In accordance with the present invention I have found that the alkali-metal tripolyphosphates, and particularly sodium tripolyphosphate, may be used in place of the alkali-metal metaphosphates employed in accordance with my prior patent. The alkali-metal tripolyphosphates are chemical compounds of the formula $M_5P_3O_{10}$ in their anhydrous form. Sodium tripolyphosphate is the most common and important of the alkali-metal tripolyphosphates and will be referred to herein in describing the invention, it being understood that other alkali-metal tripolyphosphates, such for example as potassium, lithium and ammonium tripolyphosphates, may be used. Chemical and X-ray analyses show that sodium tripolyphosphate is a definite chemical compound which is distinct from both sodium metaphosphate and sodium pyrophosphate. Sodium tripolyphosphate is fusible and may be solidified by very rapid cooling in a glassy amorphous form. Under slower cooling it solidifies in the form of crystals. The glass may be converted into crystal form by annealing. Sodium tripolyphosphate forms a crystalline hydrate of the general formula $Na_5P_3O_{10}.6H_2O$. Sodium tripolyphosphate is colorless, appearing white in the granulated crystalline form. When crushed it forms a free-flowing granular mass. By suitable precautions it may be produced in a mass which readily disintegrates into its constituent fine crystals. Sodium tripolyphosphate is not deliquescent and particularly in its hydrated form may be preserved indefinitely in ordinary atmospheres without caking or picking up moisture. Sodium tripolyphosphate is readily water-soluble in both its glassy and crystalline forms. In moderately dilute solutions, say, of about 0.5%, it produces a mildly alkaline solution of a pH value of approximately 9.8, which is definitely and remarkably stable and does not decompose on standing.

Sodium tripolyphosphate may be made by using sodium carbonate and phosphoric acid, or mixtures of acid orthophosphates. Suitable quantities of sodium carbonate and phosphoric acid to yield a molar ratio of 5 to 3 between $Na_2O$ and $P_2O_5$ may be heated in a suitable furnace until the water formed by the reaction of the sodium carbonate and phosphoric acid, together with any water of crystallization, is driven off. The mixture at temperatures somewhat in excess of 750° C. is pasty and may be poured from the furnace into molds or onto a casting wheel. The fluidity of the mixture is increased by increasing the temperature and at 860° C. it will be entirely fluid and contain no solid component. At temperatures in excess of 610° C. and below those of complete fluidity, the solid phase is crystalline anhydrous sodium pyrophosphate. As the temperature decreases toward 610° C., the amount of the solid phase of sodium pyrophosphate crystals increases until the mass becomes quite thick and mushy.

If the mixture is heated above 860° C., which is above the temperature at which solid sodium pyrophosphate can exist, the mixture is completely fluid, and upon very rapid chilling it becomes a supercooled liquid which may be considered as sodium tripolyphosphate in non-crystalline glassy form. In order to obtain the tripolyphosphate in such glassy form, the fluid mass must be cast in thin layers against cold surfaces, so that it is supercooled in liquid form before there is an opportunity for the formation of pyrophosphate crystals. Upon annealing, the glassy tripolyphosphate may be converted into crystalline form.

It is preferred, however, to form the crystalline tripolyphosphate by slow cooling of the fluid or pasty mixture. If the reaction mixture is heated to a temperature between 610° C. and 860° C. a more or less pasty mass, depending upon the temperature, is formed containing crystals of sodium pyrophosphate in a molten mass. If the mass is heated above 860° C. and slowly cooled, the same type of mass is formed, namely, sodium pyrophosphate crystals in the molten matrix. The proportion of sodium pyrophosphate crystals increases as the temperature decreases toward 610° C. As the temperature is decreased below about 610° C., which is the peritectic or incongruent melting point of the sodium tripolyphosphate, the sodium pyrophosphate crystals disappear and crystals of sodium tripolyphosphate appear. If the mass is allowed to cool rapidly to appreciably below 610° C., the pyrophosphate crystals will be trapped and the resultant solid will contain pyrophosphate crystals in amount depending upon the rapidity of the cooling. Corresponding to the amount of pyrophosphate left in the mixture, there will be an equivalent amount of metaphosphate which will usually be in the form of hexametaphosphate. On the other hand, if the mass is cooled slowly from about 610° C., the pyrophosphate crystals will entirely disappear and the mass will solidify as sodium tripolyphosphate in anhydrous crystalline form.

The mass may, for example, be cooled slowly from 610° C. to 550° C. in about one-half an hour's time, which will result in the formation of a solid consisting of tripolyphosphate crystals, or the mass may be held at about 600° C. for about one-half hour, in which case sodium pyrophosphate crystals will disappear and the mass will go completely solid as sodium tripolyphosphate crystals. After the complete conversion of the mass to sodium tripolyphosphate crystals, the cooling thereafter may be rapid.

The mass of tripolyphosphate crystals thus prepared is readily disintegrable into a fine crystalline powder.

Instead of phosphoric acid and sodium carbonate, there may be used as starting ingredients phosphoric pentoxide and sodium hydroxide, or a mixture of monosodium orthophosphate and disodium orthophosphate, or a mixture of sodium metaphosphate and sodium pyrophosphate, or other suitable soda base and source of $P_2O_5$. In each case the proportions of the mixture are so chosen that the molar ratio between $Na_2O$ and $P_2O_5$ is as 5 to 3 if a pure sodium tripolyphosphate is to be obtained.

Sodium tripolyphosphate may also be prepared by heating to reaction temperatures below 540° C. a mixture of hydrated monosodium orthophosphate and hydrated disodium orthophosphate. This mixture when heated melts in its water of crystallization and if maintained at a temperature of about 500° C. will lose substantially all of its water, becoming a white crystalline mass, which upon cooling likewise readily disintegrates into a fine white powder consisting of crystalline sodium tripolyphosphate. In this reaction the sodium tripolyphosphate appears to be formed directly without the production of pyrophosphate crystals, and therefore precautions do not have to be taken to cool the mass slowly.

Sodium tripolyphosphate has a number of advantages over the sodium hexametaphosphate or Graham's salt, which is the preferred metaphosphate employed according to my prior patent. Casein compounds are made by soaking the dry casein in water for a sufficient length of time to moisten each particle thoroughly, and then a solubilizing agent is added. This is generally done by dissolving the solubilizing agent in a small amount of water and mixing it with the casein. Various alkali-solubilizing agents have been used, such as sodium silicate, sodium aluminate, sodium phosphate, sodium carbonate, sodium borate, sodium hydroxide, ammonium hydroxide, or the corresponding potassium salts. Slaked lime has not proved desirable as a solubilizing agent for casein paper coating compositions, although it has been used with considerable success in the manufacture of casein glues.

Sodium tripolyphosphate is more stable in alkaline solutions than sodium metaphosphate. Sodium metaphosphate particularly in alkaline or highly heated solutions, has a greater tendency to revert to sodium orthophosphate than does the sodium tripolyphosphate. This reversion into the orthophosphate is objectionable particularly in the presence of lime which may be used as the solubilizing agent for the casein since the lime may react with the sodium orthophosphate to produce a precipitate of tricalcic phosphate. The lesser tendency of the sodium tripolyphosphate to revert to the orthophosphate in the alkaline-casein compositions is a distinct advantage over the metaphosphate.

The sodium tripolyphosphate in itself produces an alkaline solution of a pH value of nearly 10, as contrasted with the slightly acid reaction of sodium metaphosphate. The amount of other alkaline material used for the purpose of solubilizing the casein may therefore be decreased when sodium tripolyphosphate is employed, or, stated in another way, the sodium tripolyphosphate of itself has a greater solubilizing effect on casein than sodium metaphosphate. Sodium tripolyphosphate is not hygroscopic, as is sodium hexametaphosphate. Furthermore, it can be readily prepared in crystalline form, whereas sodium hexametaphosphate is a glassy substance. Sodium tripolyphosphate can therefore be readily prepared as a free-flowing material which will not become moist upon standing in ordinary atmospheres, as does the metaphosphate. Like sodium hexametaphosphate, it increases the working life of plastic casein compositions.

In the preparation of lime-containing casein coatings, the following proportions of ingredients may be employed:

| | Parts by weight |
|---|---|
| Casein | 100 |
| Lime | 20–30 |
| Sodium tripolyphosphate | 30–185 |

The "working life", which is the period of time from the making of the coating to the time at which it solidifies or sets or becomes so viscous that it is unsuitable for the intended purpose, is roughly proportional to the amount of sodium tripolyphosphate added. In making the coating, the casein is preferably soaked for about an hour in about three times its weight of water which contains the desired amount of sodium tripolyphosphate, the mixture being stirred. Then while stirring the casein-tripolyphosphate solution, the lime dissolved in 100 parts of water is added. The stirring is continued thereafter for about one-half hour and the desired mineral matter is added. The mineral matter may be white clay, precipitated chalk or other suitable material. The amount of each of these minerals to be added varies from about 5 to 20 parts per 100 parts of casein and depends largely upon the type of coating desired.

The addition of sodium tripolyphosphate to casein paper coatings is very effective in solving the chief difficulty involved in the use of these coatings, that is, keeping the viscosity of the mixture at such a point that it may be easily applied by the brushes. It likewise reduces the amount of foaming encountered in mixtures of this type.

Sodium tripolyphosphate also has an emulsifying action on casein-water-oleaginous mixtures. If casein in excess is added to an aqueous 10% sodium tripolyphosphate solution, the solution shaken and the excess casein filtered off, a casein solution results which will form a stable emulsion with oleic acid.

My invention is applicable to the production of casein paints. Casein paints as now generally produced are made by mixing casein and an alkali such, for example, as lime, together with whiting, clay, or other paint pigments, and a preservative such as borax. In general, the amount of casein used is approximately 15%, the amount of lime, if that is the alkali which is employed, is about 15%, and the remainder of the composition is made up by the other paint pigments, fillers and coloring pigments. It will be understood that these percentages vary greatly according to the particular type of paint. The working life of such casein paints is extremely short. Calcium caseinate is formed almost immediately upon mixing with water and the resulting paint becomes so thick that it cannot be used.

I have found that by adding sodium tripolyphosphate to casein paint in approximately the same proportions as given in connection with the preparation of casein paper coatings, I am able to prolong the working life of the paint considerably. Another advantage in the use of sodium tripolyphosphate in casein paints is that it enables one to add water at any time during the working life of the paint to allow for such evaporation as has taken place. This is a decided advantage as it is recognized that casein paints heretofore known cannot be diluted after they have once been prepared.

My invention is applicable also to the production of casein glues, core binder preparations and other adhesives. The excellent properties of casein glues have been known for a long time. Casein glues containing lime have been used for many years in the preparation of water-proof joints since calcium caseinate is a highly insoluble salt. A serious failing of this type of glue is, however, that its working life is so short as to necessitate making it up in very small quantities, which involves considerable waste. I have found that by adding an alkali-metal tripolyphosphate such as sodium tripolyphosphate to such casein glues, the working life thereof can be markedly increased without affecting adversely the adhesive properties of the glue.

Heavy metal salts, such as the soluble salts of copper, zinc, lead, tin, etc., may be added to the casein glue. These heavy metal salts form caseinates, for example copper caseinate, which are very insoluble and increase markedly the water-proof properties of the glue. Where heavy metal salts are employed with casein glues, it is necessary to use the glue up immediately since hardening takes place very rapidly. However, by the addition of sodium tripolyphosphate, the working life of such glues may be greatly increased.

The alkali-metal tripolyphosphates employed in accordance with the present invention in the production of casein products are effective in improving not only such products as contain lime and magnesium, but also such products as do not contain them. Sodium tripolyphosphate is particularly effective in casein products containing lime or magnesium for the reason, it is believed, that, in addition to the specific solubilizing effect of the tripolyphosphate on the casein, there is the additional effect of the tripolyphosphate on the lime or magnesium by which they are sequestered or locked up in a but entirely slightly ionized condition in a soluble sodium-calcium tripolyphosphate complex molecule or a soluble sodium-magnesium tripolyphosphate complex molecule. This prevents the calcium and magnesium from reacting immediately with the casein to form the caseinates which are insoluble.

Other alkalies than lime may be used as the solubilizing agent for the casein whether the product is to be used as a coating or sizing agent, paint, glue or other composition.

The invention is not limited to the preferred materials or examples, but may be otherwise embodied or practiced within the scope of the following claims.

I claim:

1. A plastic setting mass adapted for use as coating and sizing compositions, paints, glues and the like, containing casein and an alkali-metal tripolyphosphate.

2. A plastic setting mass adapted for use as coating and sizing compositions, paints, glues and the like, containing casein and sodium tripolyphosphate.

3. A plastic setting mass adapted for use as coating and sizing compositions, paints, glues and the like, containing casein, a solubilizing agent other than alkali-metal tripolyphosphate for casein, and sodium tripolyphosphate.

4. A plastic setting mass adapted for use as coating and sizing compositions, paints, glues and the like, containing casein, an alkaline earth metal oxide, and an alkali-metal tripolyphosphate.

5. A plastic setting mass adapted for use as coating and sizing compositions, paints, glues and the like, containing casein, lime, and an alkali-metal tripolyphosphate.

6. A plastic setting mass adapted for use as coating and sizing compositions, paints, glues and the like, containing casein, a solubilizing agent other than alkali-metal tripolyphosphate for casein, a heavy metal salt, and an alkali-metal tripolyphosphate.

CHARLES SCHWARTZ.

CERTIFICATE OF CORRECTION.

Patent No. 2,182,357. December 5, 1939.

CHARLES SCHWARTZ.

It is hereby certified that error appears in the printed specification of the above numbered patent requiring correction as follows: Page 3, second column, line 20, for the word "entirely" read extremely; and that the said Letters Patent should be read with this correction therein that the same may conform to the record of the case in the Patent Office.

Signed and sealed this 16th day of January, A. D. 1940.

(Seal)

Henry Van Arsdale,
Acting Commissioner of Patents.